J. CODVILLE.
Seed and Fertilizer Sowers.

No. 154,842. Patented Sept. 8, 1874.

WITNESSES:
Chas. N. Ida
O. Sedgwick

INVENTOR:
J. Codville
BY
ATTORNEYS.

THE GRAPHIC CO. PHOTO-LITH. 39 & 41 PARK PLACE, N.Y.

UNITED STATES PATENT OFFICE.

JAMES CODVILLE, OF WOODSTOCK, CANADA.

IMPROVEMENT IN SEED AND FERTILIZER SOWERS.

Specification forming part of Letters Patent No. 154,842, dated September 8, 1874; application filed June 20, 1874.

*To all whom it may concern:*

Figure 1:
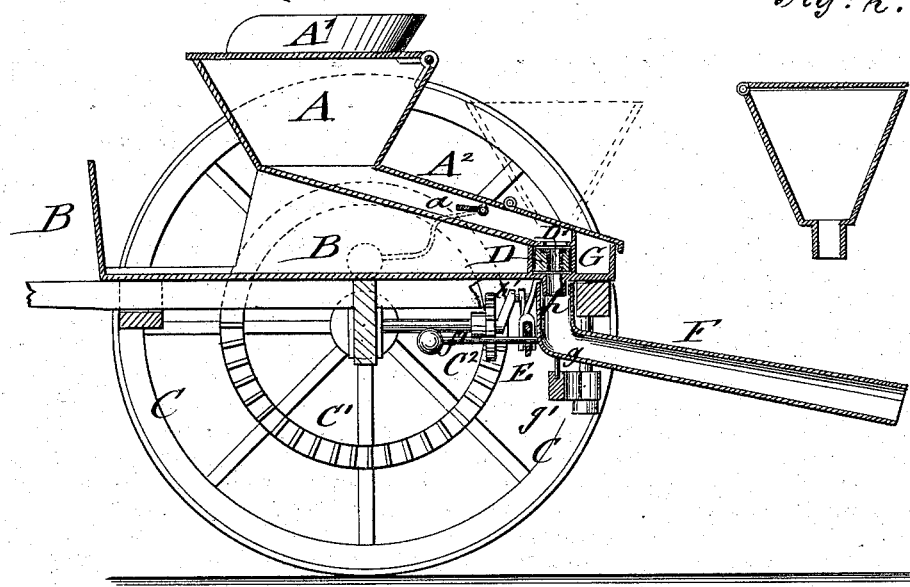
Figure 2:
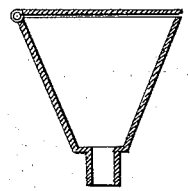
Figure 3:
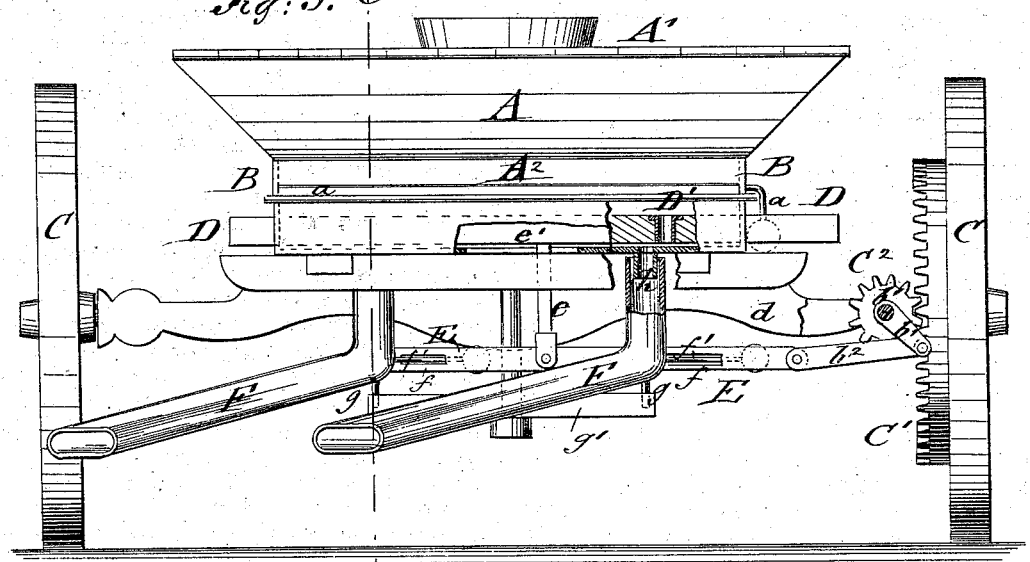

Be it known that I, JAMES CODVILLE, of Woodstock, in the Province of Ontario and Dominion of Canada, have invented a new and Improved Seed-Sower and Fertilizer, of which the following is a specification:

In the accompanying drawing, Figure 1 represents a vertical longitudinal section of my improved seed-sower and fertilizer on the line $c\ c$, Fig. 3; Fig. 2, a vertical transverse section of an additional hopper for sowing plaster, grass, &c.; and Fig. 3, a rear elevation of the sower, partly in section, to show connection of seed-regulating cups with distributing elbow-pipes.

Similar letters of reference indicate corresponding parts.

My invention relates to improvement in seed-sowers and fertilizers, which are of cheap, compact, and very effective construction, allowing great rapidity of sowing, and the distribution of the exact quantity required. The invention consists of a hopper conveying the seed to the sliding seed-dropping bar, to which motion is imparted by the supporting-wheels, intermitting pinion, and crank-rod, jointly with the pivoted weighted elbow-pipes, said sliding seed-bar having feed-cups for regulating the quantity of seed, and feeding it to the swinging elbow-pipes thereon for distributing the seed or fertilizers broadcast over the ground.

In the drawing, A represents the hopper, which is placed on a body or frame, B, with wheels C, to be drawn either by horses or operated by hand, for admitting sowing in fields with stumps, not accessible to a horse-vehicle. The hinged lid A of the hopper forms, at the same time, the seat for the driver, while an inclined hopper-extension, $A^2$, conveys the seed, fertilizer, or other article to be distributed to the sliding seed-dropping bar D, at the rear of body B, being regulated in its passage by suitable guide-flanges and a hinged and weighted gate, $a$. An additional detachable hopper may be placed directly over the seed-dropping bar, on throwing the hinged lid of extension $A^2$ into open position, for distributing plaster or other fertilizer, grass-seed, &c., which is liable to get packed in the hopper-extension when damp. The space between the inclined hopper-extension and the body of the sower serves for storing away the seed or fertilizer bags, so that a sufficient quantity may be carried along without necessitating the returning to the place of storage. A cog-wheel, $C^1$, applied to the inside of one wheel, C, gears with a pinion, $C^2$, placed vertically to it on a crank-shaft, $b$, which turns in bearings of the axle $a$, and a laterally-projecting arm, $d$, of body B. The crank $b^1$ connects, by a pivoted lever-rod, $b^2$, with a driving-bar, E, which is suspended centrally by a rod, $e$, moving in slot $e'$ of body B from sliding seed-bar D, imparting thereby simultaneous reciprocating motion to driving-bar E and seed-bar D. Driving-bar E is provided with slots $f$ for the rear-extending rods $f'$ of distributing elbow-pipes F, which are pivoted by a pivot-pin, $g$, near their elbow to a lateral detachable bar, $g'$, and connected at their upper ends with short guide-tubes $h$ of the body B, for conveying the seed from the sliding bar D to the elbow-pipes. The seed-bar D is provided with perforations and interchangeable seed-cups $D'$, of smaller and larger size, for regulating the quantity of seed or fertilizing material fed to the elbow-tubes, as required by size and quantity of the seed. The cups $D'$ have projecting side flanges, by which their position is secured in the sliding seed-bar D, without being liable to get detached or turned. The elbow-pipes F are flattened at their outer ends, and weighted at the rear rods, which, in connection with the action of the slotted driving-bar, imparts a jerk to the pipes at the end of the swinging motion, so as to throw out the seed completely and farther, and sow the same evenly broadcast over the field.

The apparatus is worked with great rapidity, and may be attended to by a woman or boy, as the action is perfectly mechanical, and requires no supervision or attention, except from time to time a new supply of seed to the hopper.

For storing the sower away, the elbow-pipes are detached and placed into the space or box G adjoining the sliding seed-bar, together with the cups and tools required. The lid of the hopper-extension is then locked over the same, and the whole retained thereby in a safe and compact manner therein.

A suitable spring-lever or other mechanism serves to throw the pinion out of gear when the sowing has to be interrupted.

Any kind of seed or fertilizer may be sown by the machine, which recommends itself on account of its efficacy, compactness, and durability for all sowing and fertilizing purposes.

Having thus described my invention, I claim as new and desire to secure by Letters Patent—

1. In a seed-sower and fertilizer-distributer, the combination of a seed-conveying hopper, sliding seed-dropping bar, and connecting pivoted vibrating distributing elbow-pipes, operated simultaneously in connection with supporting-wheels, for throwing the seed or fertilizer broadcast over the field, substantially as and for the purpose set forth.

2. The distributing elbow-pipes F, pivoted detachably to lateral bar $g$ and seed-conveying tubes $h$ of body B, and provided with weighted rear-extending rods $f'$, in combination with reciprocating bar E, having slots $f$, for imparting jerking and swinging motion to the pipes, for the more effective throwing out of the seed, as described.

3. The combination of seed-dropping bar D, connecting suspension-rod $e$, lateral driving-bar E, and cog-wheel $C^1$ of wheel C, for imparting simultaneous reciprocating motion to seed-dropping bar and pipe-driving bar, as set forth.

JAMES CODVILLE.

Witnesses:
  JOSEPH CODVILLE,
  A. NEWTON.